United States Patent [19] … [11] Patent Number: 5,395,496
Tsantrizos et al. … [45] Date of Patent: Mar. 7, 1995

[54] PROCESS FOR THE SYNTHESIS OF FULLERENES

[75] Inventors: Peter G. Tsantrizos, Ville St-Pierre; Serge Grenier, Montreal, both of Canada

[73] Assignee: Pegasus Refractory Materials, Inc., Montreal, Canada

[21] Appl. No.: 51,556

[22] Filed: Apr. 23, 1993

Related U.S. Application Data

[63] Continuation-in-part of Ser. No. 864,538, Apr. 7, 1992, abandoned.

[51] Int. Cl.$^6$ .............................................. C01B 31/00
[52] U.S. Cl. .................... 204/173; 423/445 B
[58] Field of Search ................ 423/445 B, 1; 204/173, 204/157.47

[56] References Cited

U.S. PATENT DOCUMENTS

| | | | |
|---|---|---|---|
| 4,767,608 | 8/1988 | Matsumoto et al. | 423/446 |
| 5,010,829 | 4/1991 | Kulkarni | 110/346 |
| 5,071,677 | 12/1991 | Patterson et al. | 427/249 |
| 5,075,096 | 12/1991 | Tanabe et al. | 423/446 |
| 5,147,998 | 9/1992 | Tsantrizos et al. | 219/121.5 |
| 5,227,038 | 7/1993 | Smalley et al. | 204/173 |
| 5,273,729 | 12/1993 | Howard et al. | 423/445 |

FOREIGN PATENT DOCUMENTS 286306 10/1988 European Pat. Off. .
304220 2/1989 European Pat. Off. .

OTHER PUBLICATIONS

"Buckyball The Magic Molecule", Popular Science, Aug. 1991, Edward Edelson, pp. 52–57 and 87.
H. W. Kroto et al., "$C_{60}$: Buckminsterfullerene", Chem. Rev., 1991, pp. 1213–1235.
"Fullerenes", Robert F. Curl et al., Scientific American Oct. 1991, pp. 54–63.
R. E. Smalley, "Self-Assembly of the Fullerenes", Acc. Chem. Res., 1992, 25 98–105, p. 103.
R. Baum, "Fullerenes In Flames: Burning Benzene Yields $C_{60}$ and $C_{70}$", C&EN, Jul. 15, 1991.
D. Parker, "High–Yield Synthesis, Separation, and Mass–Spectrometric Characterization of Fullerenes $C_{60}$ to $C_{266}$" J. Am. Chem. Soc. 1991, 113, pp. 7499–7503.

*Primary Examiner*—Michael Lewis
*Assistant Examiner*—Stephen G. Kalinchak
*Attorney, Agent, or Firm*—Jacobson, Price, Holman & Stern

[57] ABSTRACT

A process is disclosed to synthesize fullerenes in a plasma reactor. It comprises introducing various amounts of carbon halides as the plasma forming gas in a plasma torch capable of producing a high enough temperature flame to dissociate the carbon bearing molecules into carbon and halogen atoms, hence forming a carbon cloud which condenses into a soot containing fullerenes. Also hydrocarbons can be introduced in the torch as the plasma forming gas and reacted with carbon halides or halogens injected therewith or directly into the plasma flame at the exit of the torch. Moreover, an inert gas, such as helium, may also be used as the plasma forming gas. The process can use a high enthalpy non-transferred d.c. plasma torch or an induction plasma torch as the plasma generating device.

28 Claims, 3 Drawing Sheets

PROCESS FOR THE SYNTHESIS OF FULLERENES

This is a continuation-in-part of U.S. application Ser. No. 07/864,538, filed Apr. 7, 1992, now abandoned.

BACKGROUND OF THE INVENTION

1. Field of the Invention

This invention relates to a new process for the synthesis of fullerenes (a family of carbon molecules). More particularly, the invention relates to a process whereby fullerenes are produced by dissociating a carbon halide or a hydrocarbon using a plasma torch.

2. Brief Description of the Prior Art

Until recently, only two forms of carbon were known to exist: graphite and diamond. In graphite the carbon atoms form sheets stacked on top of each other while in diamond, each carbon atom is covalently bonded to four other carbon atoms forming a giant network of small pyramids.

Another form of carbon, the "fullerenes", has lately been successfully synthesized and identified. Basically, fullerenes are hollow molecules made up of curled-up graphitic sheets. These carbon molecules can contain anywhere from 32 to 960 carbon atoms and are all believed to have the structure of geodesic domes. The name "fullerenes" was chosen in honour of Buckminster Fuller who developed the structure of the geodesic dome. The molecules are also called "buckminsterfullerenes" or "buckyballs" for short. The molecules containing 60 carbon atoms ($C_{60}$) are considered to be the most important due to their high stability. Molecules containing 70 carbon atoms ($C_{70}$) are also highly stable. Hence, "buckyballs" often refer to $C_{60}$ and/or $C_{70}$. Molecules containing very large numbers of carbon atoms are also called "hyperfullerenes".

In 1985, Robert F. Curl and Richard E. Smalley of Rice University working with Harold W. Kroto of the University of Sussex, found that a new form of carbon, $C_{60}$, could be made by vaporizing graphite in helium using a pulsed laser beam. The production rate of fullerenes using this technique is, however, extremely slow (few grams/day).

In May 1990, five years later, Wolfgang Kratschmer and Donald Huffman were the first to observe and positively identify this molecule. At a conference in Germany in early September of 1990, Kratschmer and Huffman announced that they had found a much simpler way to synthesize $C_{60}$. They were able to make fullerenes by striking an arc between two graphite electrodes and collecting the soot formed from the vaporized carbon. However, with a production rate of roughly 1 gram/hour, the arc vaporization of graphite is also a very slow process.

Several recent articles describe fullerenes and their uses and potential applications. For example, in the article by Edward Edelson entitled "BUCKYBALL—The Magic Molecule", published in Popular Science, August 1991, a good review of the discovery, methods of production and uses of fullerenes or "buckyballs" is made. An article by Robert F. Curl and Richard E. Smalley entitled "Fullerenes" in Scientific American for October 1991 discusses the difficulties encountered in producing "visible amounts" of fullerenes and describes the carbon arc method for making the product in microscopic quantities. Another good description in particular of $C_{60}$ fullerenes is provided in Chemical Reviews 1991 of the American Chemical Society by Kroto et al., pp 1213-1235, which, among other things describes the isolation, separation and structure characterization of the most useful fullerenes—$C_{60}$ and $C_{70}$.

Currently the most interesting uses of bulk $C_{60}$ and $C_{70}$ fullerenes are in electronics, where in various compound forms they can act as an insulator, a battery, a conductor, a semiconductor or a superconductor. Also fullerenes offer interesting opportunities in the plastic and pharmaceutical industries, although their use has been rather restricted until now because of the difficulty to produce them in sufficiently large quantities and at a reasonable price.

OBJECTS AND BRIEF SUMMARY OF THE INVENTION

It is an object of the present invention to obviate the difficulties of known processes for the production of fullerenes and to provide a novel process capable of making this product at a much faster rate than was possible hitherto.

Another object of the invention is to safely utilize environmentally objectionable substances, i.e. the CFCs or carbon halides and to transform them into a highly desirable product, namely fullerenes. In this regard, one should realize that in North America alone there are presently more than a million tons of CFCs in refrigerators, cars, etc. They must be collected and destroyed without releasing them into the atmosphere, to avoid depletion of the ozone layer. The process of this invention provides unique opportunity for so doing in a safe, efficient and useful manner.

The novel process in accordance with the present invention comprises introducing a carbon and halogen bearing gas or gases, such as carbon halides (compounds of carbon and chlorine, fluorine, bromine and/or iodine), which are also popularly called CFCs, directly into a plasma reactor as the plasma forming gas or injecting such carbon halides or halogens at the exit of the plasma torch in the plasma flame and reacting them with hydrocarbons used as the plasma forming gas. An inert gas, such as helium, may also be used as the plasma forming gas. Obviously mixtures of carbon halides or halogens with hydrocarbons and/or inert gases can also be used. When a carbon halide is used as the plasma forming gas, the energy of the plasma flame dissociates the carbon bearing molecules into carbon and halogen atoms. The carbon-carbon bonds are much more stable than the carbon-halogen bonds at high temperature. Consequently, a carbon cloud is formed in which carbon atoms recombine to form fullerenes and other carbon molecules, while the halogens leave the reactor in the off-gas. If a hydrocarbon is used as the plasma forming gas, the halogen atoms will act as "H getter" and ensure that few C—H bonds are formed upon cooling. The carbon atoms which condense, form soot containing a significant amount of fullerenes, which is normally higher than 1% by weight and is usually in the range of 2 to 10% by weight, depending on the operating conditions. Extraction of the fullerenes from the soot can be done in the known manner, for example as described in the article by Deborah Holmes Parker et al. entitled "High-Yield Synthesis, Separation, and Mass-Spectrometric Characterization of Fullerenes $C_{60}$ to $C_{266}$" published in the J. Am, Chem. Soc. 1991. 113, 7499-7503.

The efficiency, in terms of fullerenes content in soot, was observed to be higher when the carbon halide was used as the plasma forming gas as compared to introducing the halogen in the tail flame of a hydrocarbon plasma.

One of the main novel aspects of the present invention lies in the formation of a carbon cloud when the plasma flame dissociates the molecules of the gases employed in the process, at temperatures between about 5000° C. and 20,000° C., into carbon and halogen atoms. By controlling the chemistry and plasma torch conditions, such as power and voltage, the process is made to enhance the formation of only C—C bonds. Once the carbon cloud is formed, the annealing of fullerenes takes place in a generally known manner at a temperature between about 1000° C. and about 1500° C. as disclosed, for example, by R. E. Smalley in the article entitled "Self-Assembly of the Fullerenes" published in Acc. Chem. Res., 1992, 25, 98–105, p. 103. This temperature range is not strictly limitative since it may vary depending on the type or combination of fullerenes desired and the operating pressure of the reactor; normally it will be between 700° C. and 1600° C. The required temperature for producing the fullerenes can thus be readily determined and used by a person skilled in the art, by producing the necessary conditions beyond the plasma flame for allowing the carbon atoms in the cloud to recombine and condense as soot on a suitable surface outside of said plasma flame, which soot contains the fullerenes.

The main advantage of this new process is that it can produce fullerenes at a much faster rate (by several orders of magnitude faster) and much more economically than anything presently known.

The intense heat generated by the plasma has been used commercially for many years to partly dissociate methane and produce acetylene. In the commercial production of acetylene, a low enthalpy plasma torch is used. However, when a high enthalpy plasma torch is employed, the carbon halides or hydrocarbons break down completely to form carbon atoms which condense and form soot on both a hot substrate and on a cold surface such as a water cooled wall. The soot contains significant amounts of fullerenes.

In essence, therefore, the process of the present invention for the synthesis of fullerenes comprises: (a) feeding a plasma forming gas into a reactor and generating a plasma of said plasma forming gas within said reactor in the form of a plasma flame, said plasma forming gas consisting essentially of a carbon containing gas and a halogen containing gas selected from the group consisting of a carbon halide gas, a mixture of a carbon halide gas and a halogen gas, a mixture of a hydrocarbon gas and a halogen gas, a mixture of a hydrocarbon gas and a carbon halide gas, and a mixture of a hydrocarbon gas, a carbon halide gas and a halogen gas, said plasma forming gas being the only gas used for the synthesis; (b) dissociating said plasma forming gas in said plasma flame into carbon and halogen atoms produced in the form of a cloud; and then (c) allowing the carbon atoms in said cloud to recombine and condense as soot on a surface outside of said plasma flame, said soot containing the fullerenes. The plasma forming gas may also be used in admixture with an inert gas, such as helium, however, it cannot be admixed with hydrogen or any other gas that would interfere with the formation of C—C bonds in the cloud.

In another embodiment, the process comprises: (a) feeding a plasma forming gas into a reactor and generating a plasma of said plasma forming gas within said reactor in the form of a plasma flame, said plasma forming gas consisting essentially of a gas selected from the group consisting of a hydrocarbon gas and a mixture of a hydrocarbon gas and an inert gas; (b) feeding a halogen containing gas into said reactor, said halogen containing gas consisting essentially of a gas selected from the group consisting of a halogen gas, a carbon halide gas, a mixture of a halogen gas and a carbon halide gas, a mixture of a halogen gas and an inert gas, a mixture of a carbon halide gas and an inert gas and a mixture of a halogen gas, a carbon halide has and an inert gas, said plasma forming gas and said halogen containing gas being the only gases used for the synthesis; (c) dissociating said plasma forming gas and said halogen containing gas in said plasma flame into carbon and halogen atoms produced in the form of a cloud; and then (d) allowing the carbon atoms in said cloud to recombine and condense as soot on a surface outside of said plasma flame, said soot containing the fullerenes. Here the plasma forming gas may be used to form the plasma flame and the halogen containing gas may be injected into said plasma flame.

In a still further embodiment, the process comprises: (a) feeding an inert plasma forming gas into a reactor and generating a plasma of said plasma forming gas within said reactor in the form of a plasma flame; (b) injecting a carbon and halogen containing gas. into said plasma flame, said carbon and halogen containing gas consisting essentially of a gas selected from the group consisting of a carbon halide gas, a mixture of a carbon halide gas and a halogen gas, a mixture of a hydrocarbon gas and a halogen gas, a mixture of a hydrocarbon gas and a carbon halide gas, and a mixture of a hydrocarbon gas, a carbon halide gas and a halogen gas, said plasma forming gas and said carbon and halogen containing gas being the only gases used for the synthesis; (c) dissociating said carbon and halogen containing gas in said plasma flame into carbon and halogen atoms produced in the form of a cloud; and then (d) allowing the carbon atoms in said cloud to recombine and condense as soot on a surface outside of said plasma flame, said soot containing the fullerenes. The inert plasma forming gas is preferably helium and the carbon and halogen containing gas is preferably a carbon halide gas such as $CBrF_3$ or $C_2Cl_4$ and it may also be used in admixture with an inert gas, such as argon.

DETAILED DESCRIPTION OF THE PREFERRED EMBODIMENTS

Figure 1:
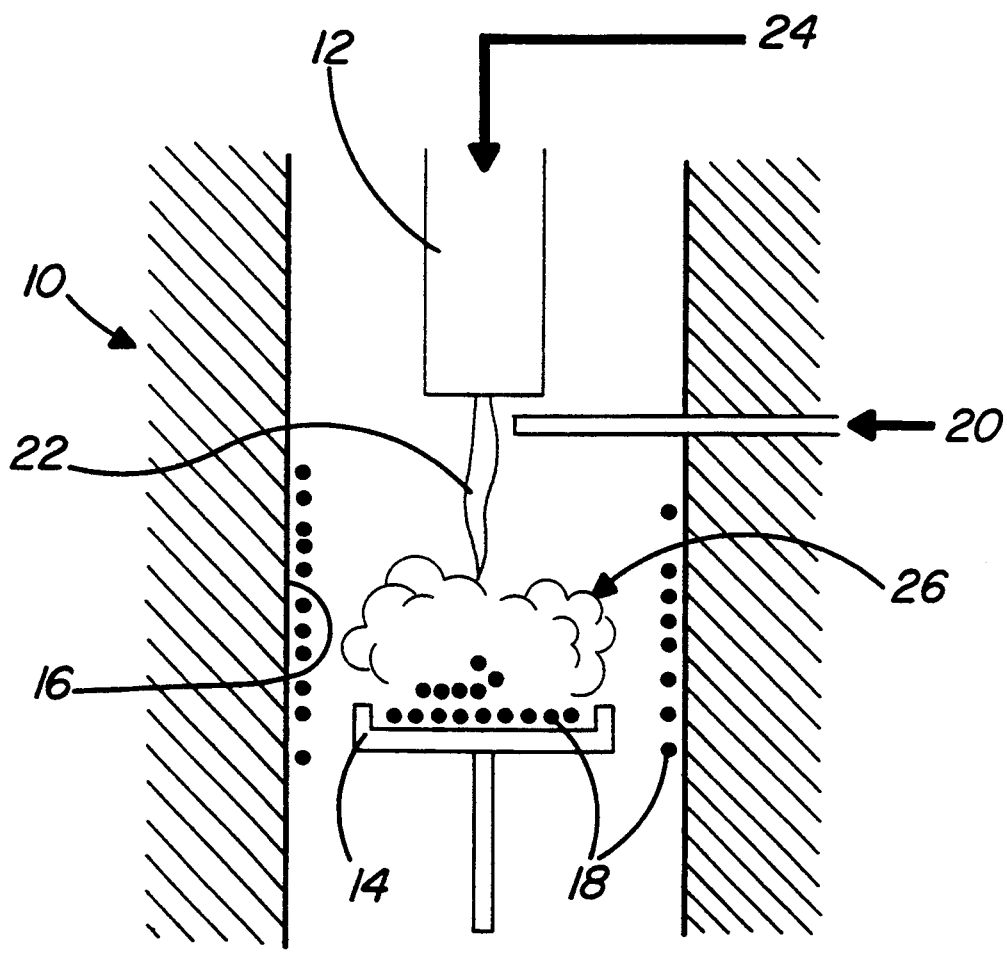
FIG. 1 illustrates a diagram of a plasma torch reactor used to carry out the process of the present invention.

Referring to the drawings, in FIG. 1 there is shown a reactor 10 in which there is mounted a high enthalpy plasma torch 12 which may be of the type disclosed in U.S. Pat. No. 5,147,998 issued Sep. 15, 1992, consisting of two coaxial tubular electrodes mounted within a housing with a gap between the two electrodes. Other plasma generating devices can also be used, including d.c. plasma guns and induction plasma torches and they are also schematically illustrated by torch 12. The plasma forming gas 24 can contain various predetermined amounts of carbon halides (e.g. $CCl_4$, $CF_4$, $CBrF_3$, $CI_4$, $CCl_2F_2$, $C_2Cl_2$ ...) which are normally used in combination with inert gas such as helium. Alternatively the plasma forming gas 24 can contain various predetermined amounts of hydrocarbons ($CH_4$, $C_2H_2$, ...) and the carbon halides can be introduced either in admixture therewith or at the exit of the plasma torch into the tail flame through opening 20. Halogens may also be introduced in admixture with the plasma forming gas 24 or through this opening 20 in lieu of or in addition to carbon halides. In this case the plasma forming gas may again be combined with an inert gas such as helium. The halogen containing gas introduced through opening 20 may also be combined with an inert gas such as argon. These combinations of reactive gases with inert gases are generally known in the art of plasma technology. The energy of the plasma flame 22 dissociates the carbon bearing molecules into C and F, Cl, Br, H or I atoms producing a cloud 26. The carbon atoms then recombine and condense on a collecting device 14 or the reactor wall 16 to form a soot 18 which contains a significant amount of fullerenes.

The invention will further be described by reference to the following non-limitative examples:

EXAMPLE 1

Figure 2:
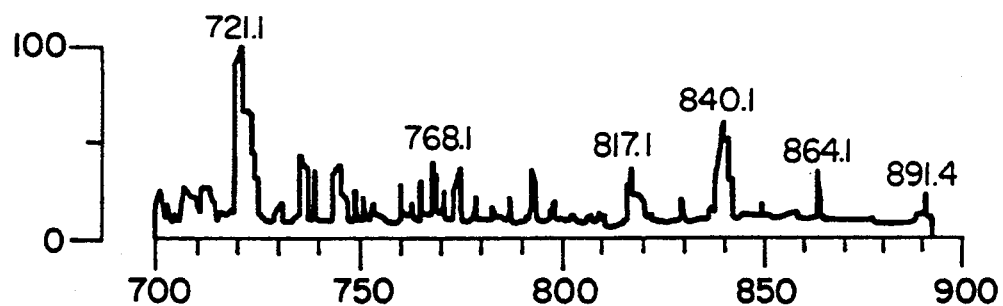
FIG. 2 represents mass spectrometry results when a carbon halide gas is used as the plasma forming gas.

The following conditions were used in an experiment where a carbon halide was employed as the plasma forming gas:
- Plasma Torch: Non-transferred D.C. Torch
- Plasma Gas: =10–20 vol. % $CBrF_3$ (Freon 13B1)+Helium (bal.)
- Injection of gas at exit of the torch: None
- Operating Pressure: Atmospheric (101.3 kPa)
- Plasma Gas Flow Rate: 50–70 L/min.
- Operating Voltage: 200–300 V
- Power: 50–70 kW Under the above conditions 6.2 grams of soot were produced in approximately 1 minute. Mass spectrometry analysis performed on the soot revealed that it contained significant amounts of $C_{60}$ and $C_{70}$. The mass spectrometry results for this Example 1 are presented in FIG. 2 and show peaks for $C_{60}$ and $C_{70}$ at 721.1 and 840.1 respectively.

EXAMPLE 2

Figure 3:
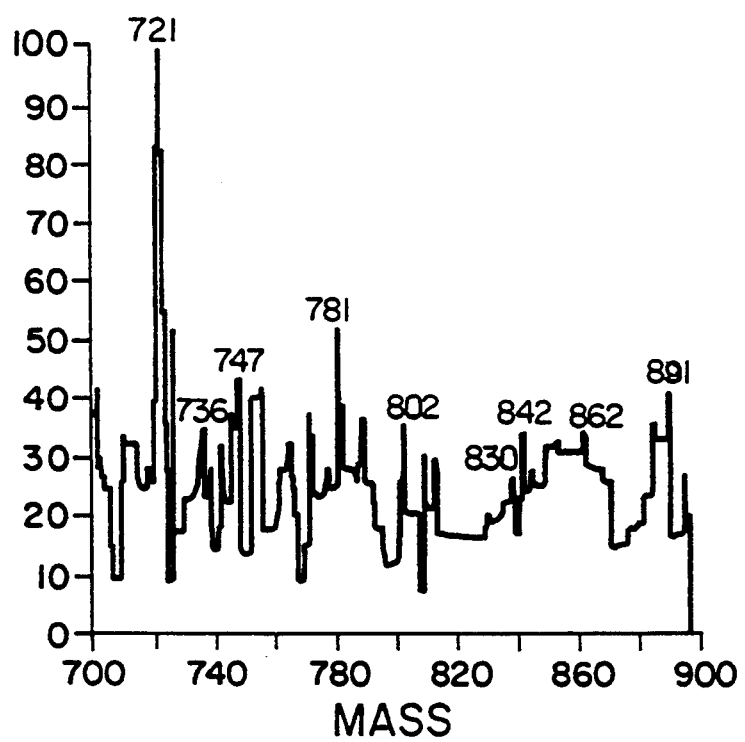
FIG. 3 represents mass spectrometry results when a hydrocarbon is used as the plasma forming gas and a halogen is introduced into the tail flame.

The following conditions were used in an experiment where a hydrocarbon was employed as the plasma forming gas and a halogen was injected at the exit of the plasma torch:
- Plasma Torch: Non-transferred D.C. Torch
- Plasma Gas: =5–10 vol. % $C_2H_2$ (acetylene)+Helium (bal.)
- Injection of gas at torch exit: Chlorine (10 L/min)+Argon
- Operating Pressure: Atmospheric (101.3 kPa)
- Plasma Gas Flow Rate: 180–200 L/min.
- Operating Voltage: 250–300 V
- Power: 40–60 kW Under the above conditions 60.8 grams of soot were produced in approximately 4 minutes. Mass spectrometry analysis on the soot revealed that it contained about half as much of $C_{60}$ as Example 1 and no $C_{70}$. The mass spectrometry results for this Example 2 are presented in FIG. 3 where the peak at 721 confirms the presence of $C_{60}$.

EXAMPLE 3

Figure 4:
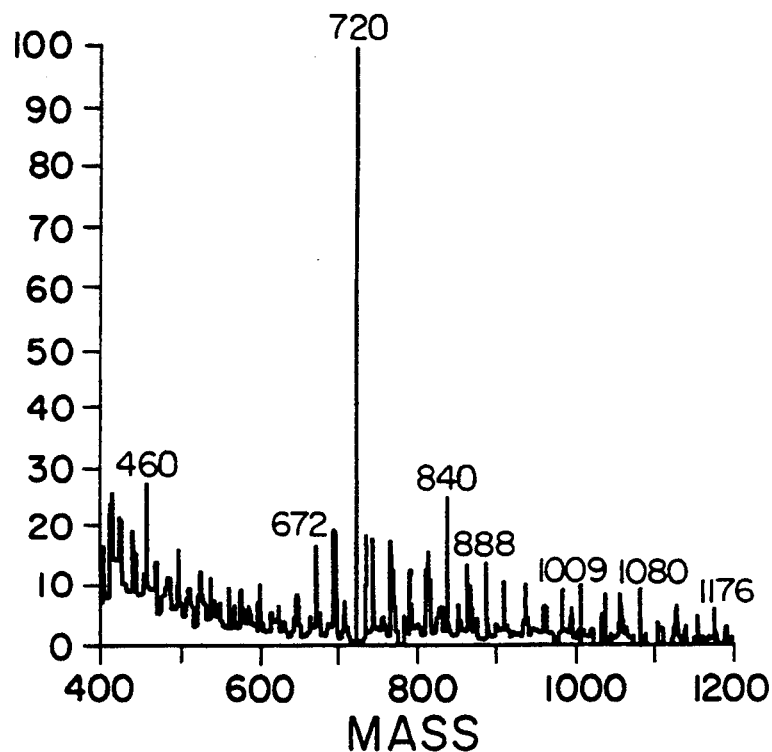
FIG. 4 represents mass spectrometry results when another carbon halide gas is used as the plasma forming gas.

The following conditions were used in an experiment where a carbon halide was again used as the plasma forming gas:
- Plasma Torch: Non-transferred D.C. Torch
- Plasma Gas: 8–10 Vol. % $C_2Cl_4$ in helium (bal.)
- Injection of gas at exit of the torch: None
- Operating Pressure: Atmospheric
- Plasma Gas Flow Rate: 120–135 L/min.
- Operating Voltage: 135–190 V
- Power: 25–40 kW Under the above conditions 8 grams of soot were collected in 3 minutes. A chromatographic extraction was performed on the soot and revealed that the fullerenes content therein was about 5% by weight. A mass spectroscopy scan on the soot is presented in FIG. 4. The peaks for $C_{60}$ and $C_{70}$ are shown at 720 and 840. Higher fullerenes are also present in the soot, as can be seen from other peaks in the figure.

EXAMPLE 4

The following conditions were used in an experiment where an inert gas, namely helium, was used as the plasma forming gas:
- Plasma Torch: Non-transferred D.C. Torch
- Plasma Gas: Helium
- Injection of gas at exit of torch: 8 L/min $C_2Cl_4$
- Operating pressure: atmospheric
- Plasma gas flow rate: 180–200 L/min
- Operating Voltage: 170–200 V
- Power: 35–40 kW.

Figure 5:
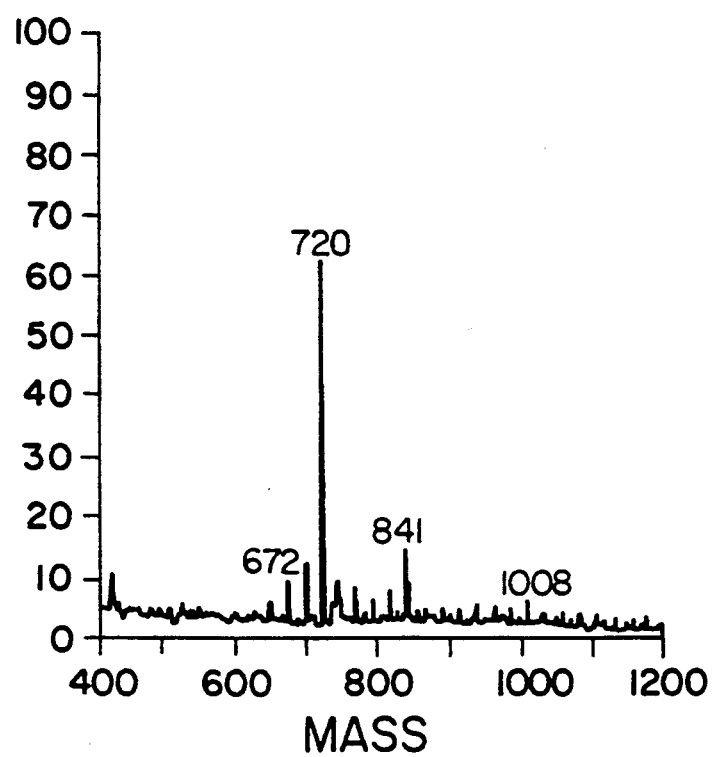
FIG. 5 represents mass spectrometry results when an inert gas is used as the plasma forming gas.

Under the above conditions 16.3 grams of soot were collected in 6 minutes; A mass spectrometry scan on the soot is presented in FIG. 5. The peaks for $C_{60}$ and $C_{70}$ are shown at 720 and 841 respectively.

The above description and the given examples represent preferred embodiments Which are by no means limitative. Various modifications that would be obvious to those skilled in the art can be made without departing from the spirit of the present invention and the scope of the following claims.

What is claimed is:

1. A process for the synthesis of fullerenes which comprises:
   a) feeding a plasma forming gas into a reactor and generating a plasma of said plasma forming gas within said reactor in the form of a plasma flame, said plasma forming gas consisting essentially of a carbon and halogen containing gas selected from the group-consisting of a carbon halide gas, a mixture of a carbon halide gas and a halogen gas, a mixture of a hydrocarbon gas and a halogen gas, a mixture of a hydrocarbon gas and a carbon halide gas, and a mixture of a hydrocarbon gas, a carbon halide gas and a halogen gas,
   b) dissociating said plasma forming gas in said plasma flame into carbon and halogen atoms produced in the form of a cloud; and then
   c) allowing substantially all of the carbon atoms in said cloud to recombine and condense as soot on a surface outside of said plasma flame, said soot containing the fullerenes being formed from essentially only the carbon and halogen containing gas.

2. Process as defined in claim 1, in which the plasma forming gas is a carbon halide gas.

3. Process as defined in claim 2, in which the carbon halide gas is a CFC.

4. Process as defined in claim 2, in which the carbon halide gas is selected from $CBrF_3$ and $C_2Cl_4$.

5. Process as defined in claim 1, in which the hydrocarbon gas is selected from $CH_4$ and $C_2H_2$.

6. Process as defined in claim 1, in which the halogen gas is chlorine.

7. Process as defined in claim 1, in which the plasma forming gas is used in admixture with an inert gas.

8. Process as defined in claim 7, in which the inert gas is selected from helium and argon.

9. Process as defined in claim 1, in which the plasma forming gas is a mixture of a hydrocarbon gas and a halogen gas.

10. Process as defined in claim 1, in which the plasma forming gas is dissociated at temperatures between about 5,000° C. and 20,000° C.

11. Process as defined in claim 1, in which the reactor uses a non-transferred d.c. plasma torch for generating the plasma flame.

12. Process as defined in claim 1, in which the reactor uses an induction plasma torch for generating the plasma flame.

13. Process as defined in claim 1, in which soot with an admixture of $C_{60}$ and $C_{70}$ fullerenes is produced.

14. A process for the synthesis of fullerenes which comprises:
    a) feeding a plasma forming gas into a reactor and generating a plasma of said plasma forming gas within said reactor in the form of a plasma flame, said plasma forming gas consisting essentially of a gas selected from the group consisting of a hydrocarbon gas and a mixture of a hydrocarbon gas and an inert gas;
    b) feeding a halogen containing gas into said reactor, said halogen containing gas consisting essentially of a gas selected from the group consisting of a halogen gas, a carbon halide gas, a mixture of a halogen gas and a carbon halide gas, a mixture of a halogen gas and an inert gas, a mixture of a carbon halide gas and an inert gas, and a mixture of a halogen gas, a carbon halide gas and an inert gas,
    c) dissociating said plasma forming gas and said halogen containing gas in said plasma flame into carbon and halogen atoms produced in the form of a cloud; and then
    d) allowing substantially all of the carbon atoms in said cloud to recombine and condense as soot on a surface outside of said plasma flame, said soot containing the fullerenes being formed from essentially only the carbon and halogen containing gas.

15. Process as defined in claim 14, in which the plasma forming gas is used to form the plasma flame and the halogen containing gas is injected into said plasma flame.

16. Process as defined in claim 14, in which the hydrocarbon gas is selected from $CH_4$ and $C_2H_2$.

17. Process as defined in claim 14, in Which the inert gas in the plasma forming gas is helium.

18. Process as defined in claim 14, in which the halogen gas is chlorine.

19. Process as defined in claim 14, in which the carbon halide gas is selected from $CBrF_3$ and $C_2Cl_4$.

20. Process as defined in claim 14, in which the inert gas in the halogen containing gas is argon.

21. Process as defined in claim 14, in which the plasma forming gas is dissociated at temperatures between about 5,000° C. and 20,000° C.

22. A process for the synthesis of fullerenes which comprises:
    a) feeding a plasma forming gas consisting essentially of an inert gas into a reactor and generating a plasma of said plasma forming gas within said reactor in the form of a plasma flame;
    b) injecting a carbon and halogen containing gas into said plasma flame, said carbon and halogen containing gas consisting essentially of a gas selected from the group consisting of a carbon halide gas, a mixture of a carbon halide gas and a halogen gas, a mixture of a hydrocarbon gas and a halogen gas, a mixture of a hydrocarbon gas and a carbon halide gas, and a mixture of a hydrocarbon gas, a carbon halide gas and a halogen gas;
    c) dissociating said carbon and halogen containing gas in said plasma flame into carbon and halogen atoms produced in the form of a cloud; and then
    d) allowing substantially all of the carbon atoms in said cloud to recombine and condense as soot on a surface outside of said plasma flame, said soot containing the fullerenes being formed from essentially only the carbon and halogen containing gas.

23. Process as defined in claim 22, in which the inert plasma forming gas is helium.

24. Process as defined in claim 22, in which the carbon and halogen containing gas is a carbon halide gas.

25. Process as defined in claim 24, in which the carbon halide gas is selected from $CBrF_3$ and $C_2Cl_4$.

26. Process as defined in claim 22, in which the carbon and halogen containing gas is used in admixture with an inert gas.

27. Process as defined in claim 26, in which the inert gas used with the carbon and halogen containing gas is argon.

28. Process as defined in claim 22, in which the plasma forming gas is dissociated at temperatures between about 5,000° C. and 20,000° C.

* * * * *